(12) United States Patent
Robinson et al.

(10) Patent No.: US 7,578,598 B2
(45) Date of Patent: Aug. 25, 2009

(54) BATTERY CHARGING WORK LIGHT

(75) Inventors: William J. Robinson, Ellicott City, MD (US); Edward A. Harrison, Bel Air, MD (US); Francis C. Ng, Towson, MD (US); James B. Watson, Fallston, MD (US)

(73) Assignee: Black & Decker Inc., Newark, DE (US)

( * ) Notice: Subject to any disclaimer, the term of this patent is extended or adjusted under 35 U.S.C. 154(b) by 133 days.

(21) Appl. No.: 11/559,002

(22) Filed: Nov. 13, 2006

(65) Prior Publication Data

US 2008/0112160 A1    May 15, 2008

(51) Int. Cl.
    *F21L 4/08*    (2006.01)
(52) U.S. Cl. .................. 362/183; 362/288; 362/253
(58) Field of Classification Search .......... 362/288, 362/183, 197–199, 253, 418, 427; 320/111
    See application file for complete search history.

(56) References Cited

U.S. PATENT DOCUMENTS

| | | | |
|---|---|---|---|
| 3,963,972 A | 6/1976 | Todd | |
| 4,749,908 A * | 6/1988 | Stifter | .................. 315/86 |
| 4,983,473 A | 1/1991 | Smith | |
| 5,214,368 A | 5/1993 | Wells | |
| 6,636,015 B1 | 10/2003 | Levine et al. | |
| 7,152,991 B2 * | 12/2006 | Jines et al. | ................... 362/135 |
| 2001/0040798 A1 | 11/2001 | Appelberg et al. | |
| 2002/0158605 A1 | 10/2002 | Sharrah et al. | |
| 2006/0108970 A1 | 5/2006 | Leasure et al. | |
| 2006/0171145 A1 | 8/2006 | Ford et al. | |

FOREIGN PATENT DOCUMENTS

| | | |
|---|---|---|
| EP | 0232159 A2 | 8/1987 |
| GB | 2402002 A | 11/2004 |
| GB | 2424694 A | 10/2006 |
| GB | 2424694 A * | 10/2006 |

OTHER PUBLICATIONS

Katie Allen, European Search Report, Jan. 25, 2008, The Hague.
Annex to the European Search Report on European Patent Application No. EP 07 12 0153.
U.S. Appl. No. 10/997,806, filed Nov. 24, 2004. in the United States Patent and Trademark Office, Jeremy D. Leasure and Mark Etter.

* cited by examiner

*Primary Examiner*—Bao Q Truong
(74) *Attorney, Agent, or Firm*—Michael Aronoff; Adan Ayala

(57) ABSTRACT

A battery charger work light includes a housing defining an envelope and a charger circuit disposed in the housing. The charger circuit is operable to charge a rechargeable battery pack. A light is movably mounted to the housing. The light is movable between an extended position outside of the envelope and a storage position inside of the envelope.

10 Claims, 4 Drawing Sheets

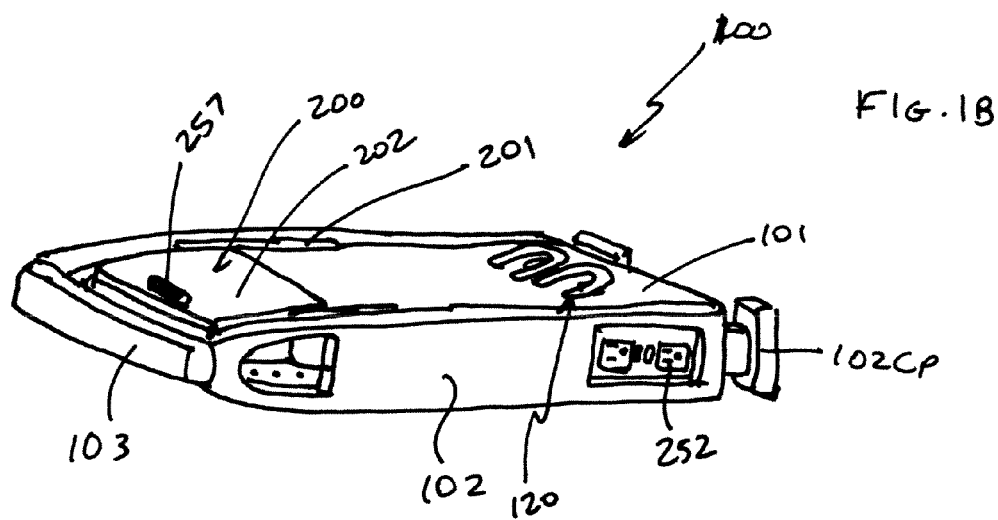
FIG. 1B
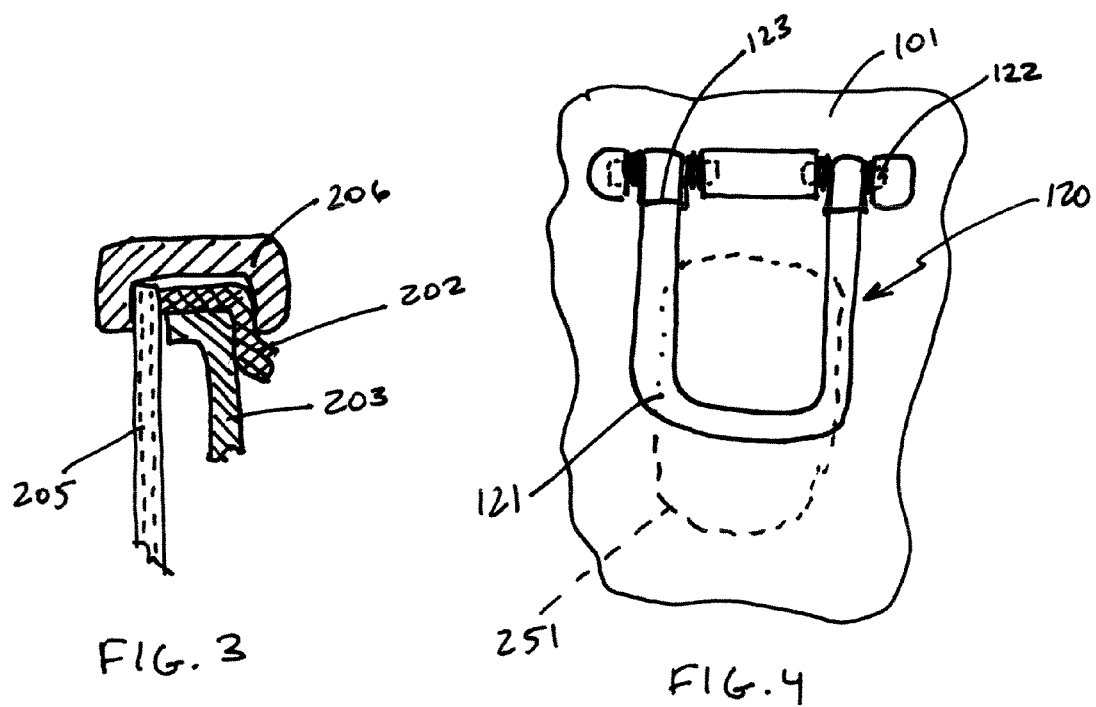
FIG. 3
FIG. 4

BATTERY CHARGING WORK LIGHT

FIELD

This specification relates to battery chargers and more specifically to battery chargers with industrial lighting worklights.

BACKGROUND

Construction performed at jobsites typically requires a variety of power tools, cordless tools, battery chargers, lighting systems and the like. This is very cumbersome for a construction worker when transporting tools, lights and battery chargers to and from the jobsite each shift, day, or the like.

Another problem caused by the number of different tools and accessories required for construction is the clutter created at the jobsite by a separate light, a separate battery charger, separate power strips for power tools and power cords strewn across the jobsite to provide power from a power source remote to the location of the construction.

This problem has been addressed by U.S. application Ser. No. 10/997,806, filed on Nov. 24, 2004, and assigned to the assignee of the present application. However, it is an object of the invention to provide improved features to better meet the needs of the construction workers at the jobsite.

SUMMARY

A battery charger work light comprising a housing defining an envelope, a charger circuit disposed in the housing, the charger circuit operable to charge a rechargeable battery pack, and a light movably mounted to the housing, wherein the light is movable between an extended position outside of the envelope and a storage position inside of the envelope.

Additional features and benefits of the present invention are described, and will be apparent from, the accompanying drawings and the detailed description below.

BRIEF DESCRIPTION OF THE FIGURES

The accompanying drawings illustrate preferred embodiments according to the practical application of the principles thereof, and in which:

FIG. 1 is a perspective view of a battery charger work light, where FIGS. 1A-1B show the work light assembly is an extended position and a storage position, respectively.

FIG. 3 is a cross-sectional view along line III-III in FIG. 1.

FIG. 4 is a top plan view of a battery hold-down assembly.

DETAILED DESCRIPTION

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
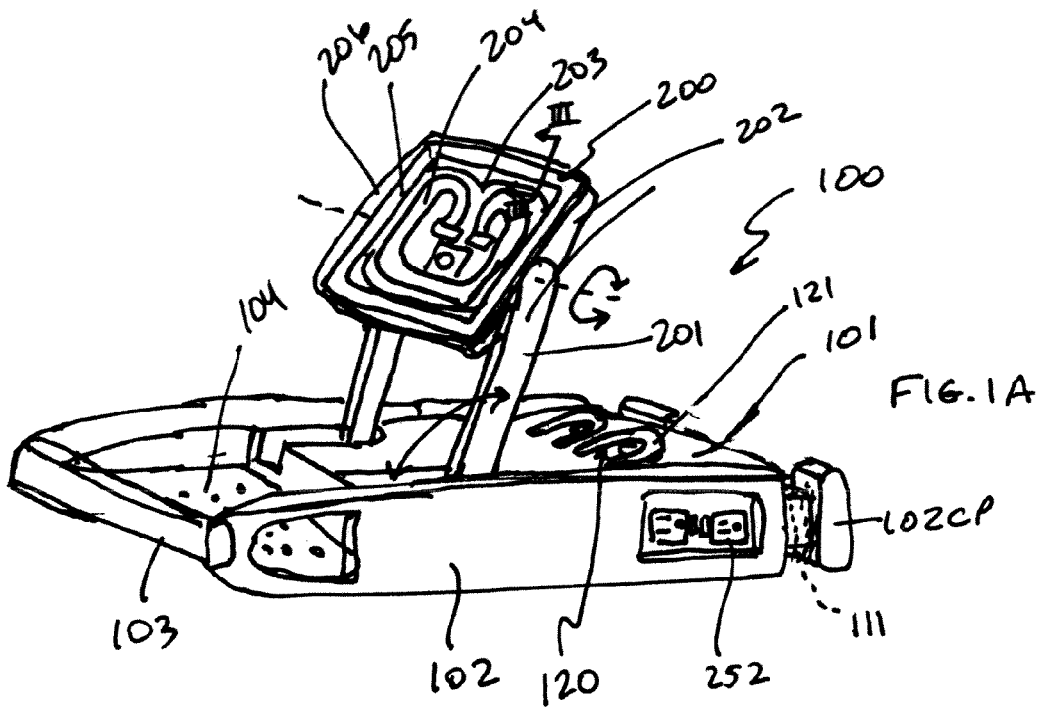
Figure 2:
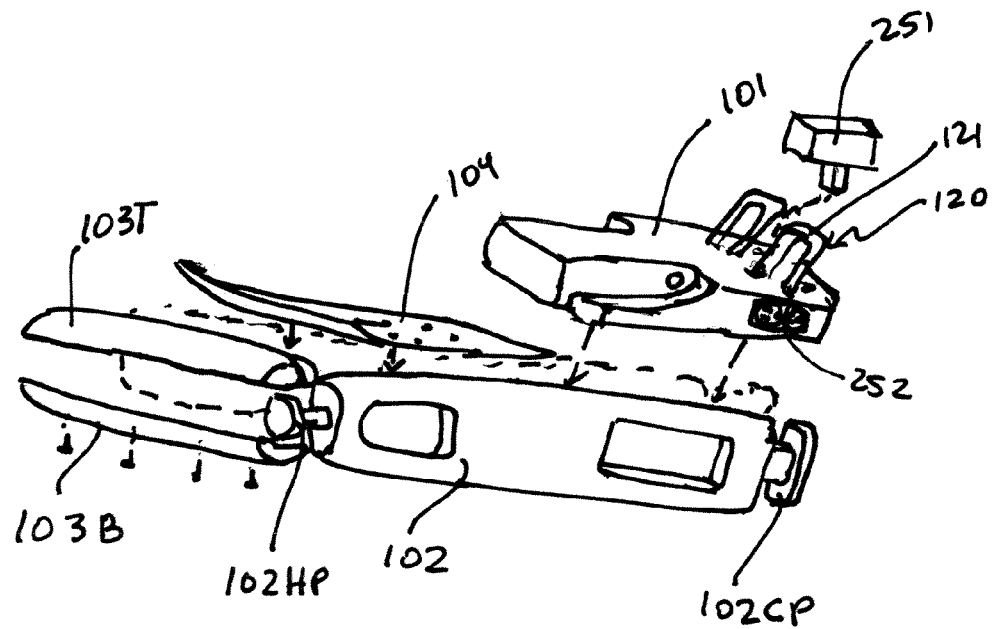
FIG. 2 is a partially exploded view the battery charger work light of FIG. 1.

In FIGS. 1-2, an exemplary battery charger work light according to the present invention is designated generally by the reference numeral 100. The battery charger work light 100 preferably includes a main housing 101. Main housing 101 is preferably made of plastic.

At least one (and preferably two) side housing(s) 102 may be attached to main housing 101. Side housing(s) 102 are preferably made of plastic.

Side housing(s) 102 preferably have a post 102HP for attaching a handle 103. As shown in FIG. 2, handle 103 is preferably made with a top handle clamshell 103T and a bottom handle clamshell 103B. Clamshells 103T, 103B preferably sandwich post 102HP. Clamshells 103T, 103B are preferably held together via screws. Clamshells 103T, 103B are preferably made of plastic.

Side housing(s) 102 preferably have a rear post 102CP to act as a cord wrap. Accordingly, users could take the AC cord 111 and wrap it around posts 102CP.

A perforated panel 104 is preferably disposed between handle 103 and main housing 101. Panel 104 may be attached to the side housing(s) 102 and/or main housing 101. Panel 104 may be made of metal or plastic.

A light assembly 200 is preferably movably connected to main housing 101 via arms 201. Light assembly 200 preferably comprises a light housing 202. Light housing 202 supports a reflector 203 and a lamp 204.

Lamp 204 may be a light bulb, a halogen bulb, a fluorescent tube, etc. Preferably lamp 204 is a double-D shaped fluorescent tube, rated at about 38 watts.

A lens or clear cover 205 may be disposed on light housing 202, enclosing lamp 204 therebetween. Preferably cover 205 is made clear polycarbonate plastic.

A flexible gasket 206 surrounds cover 205, sandwiching cover 205 between gasket 206 and light housing 202, as shown in FIG. 3. Preferably, gasket 206 is made of rubber. Persons skilled in the art will recognize that a user can replace lamp 204 by removing gasket 206 and cover 205. Such lamp replacement can thus be accomplished without requiring any tools.

Referring to FIGS. 1-2, light assembly 200 is preferably movably connected to main housing 101 via arms 201. Arms 201 may be pivotably connected to main housing 101. Preferably, the connection between arms 201 and main housing 101 is detented, so that arms 201 will stay in the selected position even after the user releases the arms 201. It is also preferable that the detent mechanism is designed so that the user can feel the detents as arms 201 are rotated relative to main housing 101.

Light housing 202 may be pivotably connected to arms 201. Preferably, the connection between arms 201 and light housing 202 is detented, so that light housing 202 will stay in the selected position even after the user releases the light housing 202. It is also preferable that the detent mechanism is designed so that the user can feel the detents as light housing 201 are rotated relative to arms 201. Preferably, light housing 202 may be pivoted at least about 180° relative to arms 201.

Persons skilled in the art will recognize that light assembly 200 is preferably movable between an extended position (shown in FIG. 1A) where the light housing 202 is outside the envelope defined by the main housing 101, side housing(s) 102 and/or handle 103, and a storage position (shown in FIG. 1B) where a substantial portion (if not all) of the light housing 202 is inside the envelope defined by the main housing 101, side housing(s) 102 and/or handle 103.

Persons skilled in the art will also recognize that a user can hang the battery charger work light 100 from a wall. As mentioned above, panel 104 is preferably perforated, allowing the user to hang panel 104 (and thus the battery charger work light 100) from a wall. The user can then pivot light housing 202 and/or arms 201 to project light to the desired area.

Figure 5:
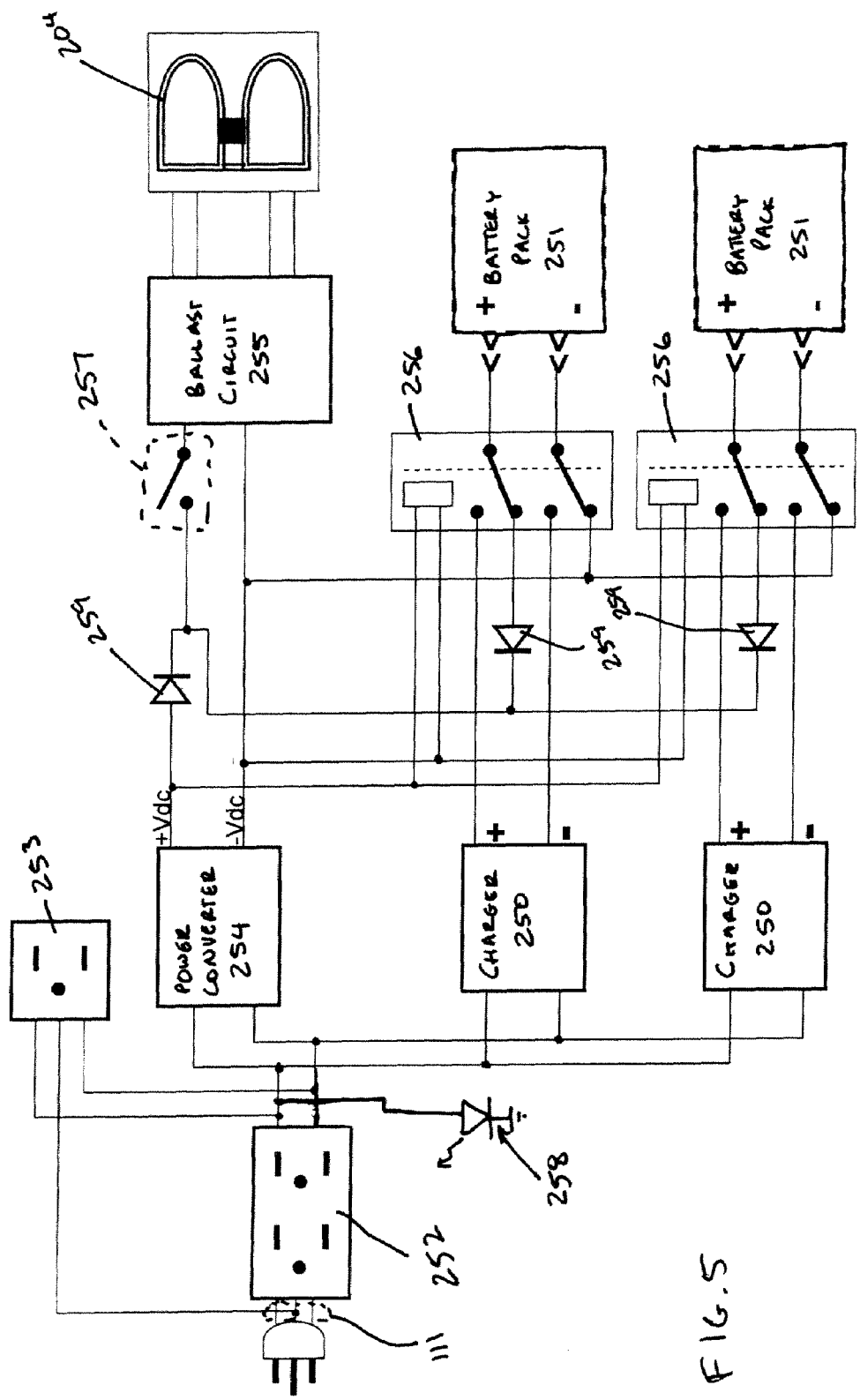
FIG. 5 is a block diagram of the circuits used in the battery charger work light of FIG. 1.

Referring to FIGS. 1 and 5, main housing 101 preferably has at least one charger 250 for charging battery packs 251. Such battery pack 251 can be disposed on main housing 101 and electrically connected to charger 250. When charging is complete, the user can disconnect the battery pack 251 from charger 250 and/or remove it from the main housing 101.

It is preferable to provide a mechanism to maintain battery pack 251 on main housing 101 during transport of the battery charger work light 100, or if the battery charger work light 100 is hung from a wall, etc. FIGS. 1-2 and 4 illustrate a battery hold-down assembly 120. Such assembly 120 preferably comprises a bar 121 pivotally attached to main housing 101. Preferably bar 121 is attached to main housing 101 via axles 122. Bar 121 is preferably not fixed on axles 122, but can rotate independently from axles 122. Springs 123 may be wrapped around axles 122 and/or bar 121 to bias bar 121 towards main housing 101.

FIG. 5 is a block diagram of the main circuit elements in the battery charger work light 100. AC power coming through cord 111 preferably go through an integrated GFCI circuit/power outlets 252. Preferably such integrated GFCI power outlets 252 are mounted main housing 101. Persons skilled in the art will recognize that the GFCI circuit and power outlets may be instead separate parts.

Several elements are preferably placed downstream from the integrated GFCI power outlets 252. For example, another outlet 253 may be mounted on main housing 101. Similarly, charger(s) 250 are connected to the integrated GFCI power outlets 252.

An LED 258 may also be placed downstream from the integrated GFCI power outlets 252 to indicate that the battery charger work light 100 has AC power and/or GFCI power protection. Preferably LED 258 emits a green light.

A power converter 254 may also be placed downstream from the integrated GFCI power outlets 252. Such power converter 254 takes the AC power coming out the integrated GFCI power outlets 252 and turns it into DC power. Preferably the power converter 254 outputs about 18 volts. The output of power converter goes through on/off switch 257 (which is preferably placed on light housing 202), ballast circuit 255 and ultimately lamp 204.

Preferably the output of power converter 254 is pulsed. This would allow power converter 254 to activate relays 256.

Persons skilled in the art will recognize that, because outlets 253, charger(s) 250, ballast circuit 255 and lamp 204, are placed downstream from integrated GFCI power outlets 252, all such elements are GFCI-protected.

Preferably, integrated GFCI power outlets 252, power outlet 253, power converter 254, ballast circuit 255, relays 256 and chargers 250 are disposed within main housing 101. Being that the on/off switch 257 and lamp 204 are s preferably placed on light housing 202, persons skilled in the art will recognize that cables will go through arm 201 to reach on/off switch 257, back down through arm 201 to connect to ballast circuit 255 and back up through arm 201 to reach lamp 204.

With such arrangement, when AC power is present, power converter 254 will close relays 256, allowing chargers 250 to charge battery packs 251. In addition, power converter 254 will provide power to ballast circuit 255 and ultimately power lamp 204.

On the other hand, when AC power is not present, relays 256 remain open (as shown in FIG. 5). This will allow battery packs 251 to provide power to the ballast circuit 255 and to ultimately power lamp 204.

Persons skilled in the art will recognize that steering diodes 259 will prevent power originating from battery packs 251 to enter power converter 254 and/or another battery pack 251.

As mentioned above, the output of power converter 254 will be about 18 volts. However, a user can use battery packs 251 having different voltages, e.g., from about 12 volts to about 18 volts, to power lamp 204. Accordingly, it is preferably to provide a circuit that will allow the brightness of lamp 204 to be relatively consistent regardless of the voltage magnitude of battery packs 251.

Figure 6:
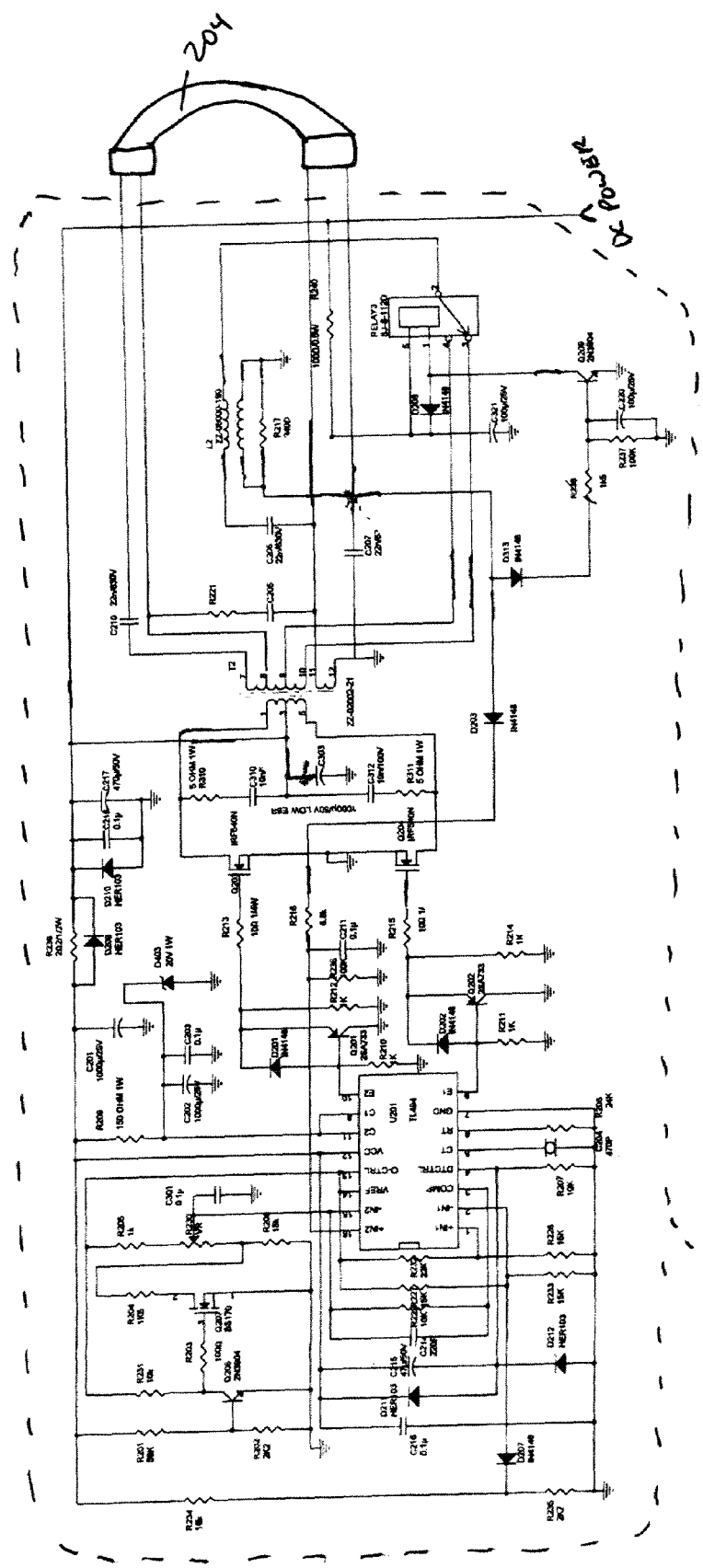
FIG. 6 is a schematic diagram of the ballast circuit shown in FIG. 5.

FIG. 6 shows the schematic diagram for ballast circuit 255. The DC power coming past switch 257 will be pulse width modulated by integrated circuit 201 and transistors Q203, Q204. Such pulse width modulation will result in an effective output voltage which will be the same, regardless of the magnitude of the DC power input. This effective voltage can then be stepped up by transformer T2 to a voltage that can power lamp 204, i.e., about 98-100 volts.

The components of ballast circuit 255 are as follows:

| | |
|---|---|
| C201 | 1000 µF/25 V |
| C202 | 1000 µF/25 V |
| C203 | 0.1 µF |
| C204 | 470 pF |
| C206 | 22 µF/630 V |
| C207 | 22 µF/630 V |
| C210 | 22 µF/630 V |
| C211 | 0.1 µF |
| C214 | 220 pF |
| C215 | 47 µF/50 V |
| C216 | 0.1 µF |
| C217 | 470 µ50 V |
| C218 | 0.1 µF |
| C220 | 100 µF/25 V |
| C301 | 0.1 µF |
| C303 | 1000 µ/50 V |
| C310 | 10 µF/100 V |
| C312 | 10 µF/100 V |
| C321 | 100 µF/25 V |
| D201 | IN4148 |
| D202 | IN4148 |
| D203 | IN4148 |
| D207 | IN4148 |
| D208 | IN4148 |
| D209 | HER103 |
| D210 | HER103 |
| D211 | HER103 |
| D212 | HER103 |
| D313 | IN4148 |
| D403 | 20 V 1 W |
| L2 | ZZ-05000-190 |
| R201 | 56 kiloohms |
| R202 | 2 kiloohms |
| R203 | 100 ohms |
| R204 | 1 kiloohm |
| R205 | 1 kiloohm |
| R206 | 15 kiloohms |
| R206 | 24 kiloohms |
| R207 | 10 kiloohms |
| R209 | 150 ohm 1 W |
| R210 | 1 kiloohm |
| R211 | 1 kiloohm |
| R212 | 1 kiloohm |
| R213 | 10 ohms ¼ W |
| R214 | 1 kiloohm |
| R215 | 10 ohms ¼ W |
| R216 | 6.8 kiloohms |
| R217 | 240 ohms |
| R227 | 15 kiloohms |
| R228 | 15 kiloohms |

-continued

| | |
|---|---|
| R229 | 10 kiloohms |
| R230 | variable resistor |
| R231 | 10 kiloohms |
| R232 | 22 kiloohms |
| R233 | 15 kiloohms |
| R234 | 16 kiloohms |
| R235 | 2.7 kiloohms |
| R236 | 100 kiloohms |
| R237 | 100 kiloohms |
| R238 | 1.5 kiloohms |
| R239 | 2 ohms 2/1/2 W |
| R240 | 100 ohms/0.5 W |
| R310 | 5 ohms 1 W |
| R311 | 5 ohms 1 W |
| RELAY3 | SJ-S-112D |
| T2 | ZZ-02002-21 |
| Q201 | 2SA733 |
| Q202 | 2SA733 |
| Q203 | IRF54ON |
| Q204 | IRF54ON |
| Q206 | 2N3904 |
| Q207 | BS170 |
| Q209 | 2N3904 |
| U201 | TL494 |

Persons skilled in the art will recognize that the purpose of RELAY3 is to assist in the initial start up of lamp 204.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A charger comprising:
a housing;
a charger circuit disposed in the housing for charging a rechargeable battery pack;
an element pivotally connected to the housing and contacting the first rechargeable battery pack during charging for maintaining the battery pack adjacent to the housing; and
a spring for biasing the element towards the housing.

2. The charger of claim 1, further comprising:
a work light mounted to the housing,
wherein the work light can be powered by the first rechargeable battery pack.

3. The charger claim 2, further comprising a power outlet disposed on the housing.

4. The charger of claim 3, wherein the power outlet is ground fault circuit interrupter-protected.

5. The charger of claim 2, wherein the light is one of the group consisting of incandescent bulbs, halogen bulbs, and fluorescent lamps.

6. The charger of claim 2, wherein the light is a fluorescent lamp.

7. The charger of claim 2, wherein the light is a double-D shaped fluorescent lamp.

8. The charger of claim 2, wherein the light is powered by a second rechargeable battery pack having a voltage magnitude different than a voltage magnitude of the first rechargeable battery pack.

9. The charger of claim 8, further comprising a power circuit connected to the light, the power circuit receiving power from one of the first and second rechargeable battery packs.

10. The battery charger work light of claim 9, wherein the power circuit provides a predetermined power output to the light regardless of the voltage magnitudes of the first and second rechargeable battery packs.

* * * * *